Figure 1:
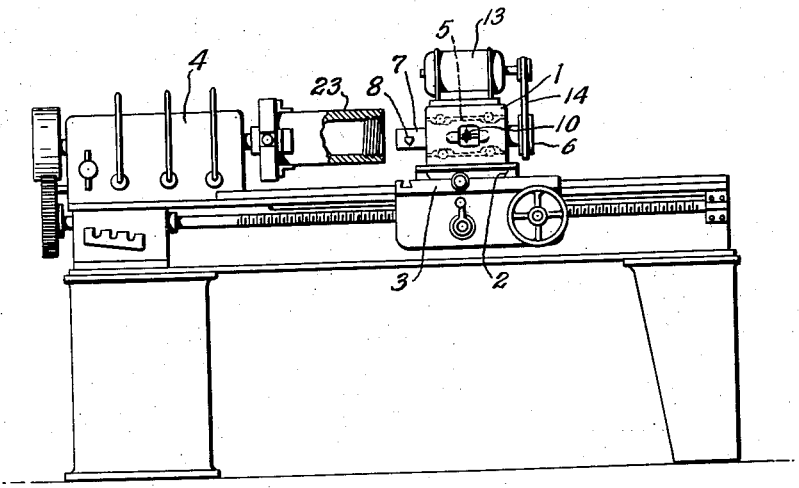

Sept. 2, 1958   K. H. BURGSMÜLLER   2,849,926
THREAD CUTTING DEVICE

Filed Sept. 25, 1952   4 Sheets-Sheet 1

INVENTOR.
KARL HEINRICH BURGSMÜLLER
BY
ATTORNEY

Sept. 2, 1958 K. H. BURGSMÜLLER 2,849,926
THREAD CUTTING DEVICE
Filed Sept. 25, 1952 4 Sheets-Sheet 2

INVENTOR.
KARL HEINRICH BURGSMÜLLER
BY James J. Cannon
ATTORNEY

Sept. 2, 1958   K. H. BURGSMÜLLER   2,849,926
THREAD CUTTING DEVICE
Filed Sept. 25, 1952   4 Sheets-Sheet 3

INVENTOR.
KARL HEINRICH BURGSMÜLLER
BY James J. Cannon

United States Patent Office 2,849,926
Patented Sept. 2, 1958

2,849,926

THREAD CUTTING DEVICE

Karl Heinrich Burgsmüller, Kreiensen am Harz, Niedersachsen, Germany, assignor to Gomerue Establishment, Vaduz, Liechtenstein Application September 25, 1952, Serial No. 311,431

4 Claims. (Cl. 90—11.64)

This invention relates to certain improvements in thread cutting in conjunction with a conventional lathe and has particular deference to devices of the kind whereby a tool rotates eccentrically to a workpiece at a relatively high rate of speed, either around, or within said workpiece, and simultaneously oscillates in a direction along the axis of said workpiece, while said workpiece rotates at a relatively low rate of speed.

In the present invention the device is mounted on the carriage of a lathe, and is moved on said carriage along said workpiece in a conventional manner used for thread cutting. Said device consisting of a shaft rotatably mounted in a case and free to move axially and a control mechanism to cause said shaft to oscillate. Said shaft is driven by an electric motor, or similar means. Said motor is also mounted on said lathe carriage together with said device. The rotational axis of said shaft is positioned eccentrically to the rotational axis of said workpiece to effect an intermittent cut. A tool, attached adjustably to one end of said shaft, removes a short chip only from said workpiece during each revolution of said shaft. Said chips being removed in rapid succession from said slowly rotating workpiece resulting in a continuous smooth cut. Said control mechanism consisting of guide wheels and guide grooves, as hereinafter described in more detail, give said tool an axial and harmonic oscillation with the rotation of said shaft. With each rotation and oscillation, said tool will as a result of said oscillation, cut alternately and remove a short flat chip from either of the two adjacent flanks of the thread groove being cut, thereby effecting single flank thread cutting, achieving a very smooth thread. Said flat chips, aided by a long cooling path during the non-cutting stroke of said tool, relieve said tool substantially of mechanical and thermal stresses occurring during the thread cutting operation. The life of said tool is thereby extended and the efficiency of the thread cutting operation is increased, due to fewer tool changes.

Other and further objects, features and advantages of the invention will be pointed out hereinafter and appear in the appended claims forming part of the application.

In the accompanying drawings preferred embodiments of the invention are shown by way of illustration and not by way of limitation.

Figure 2:
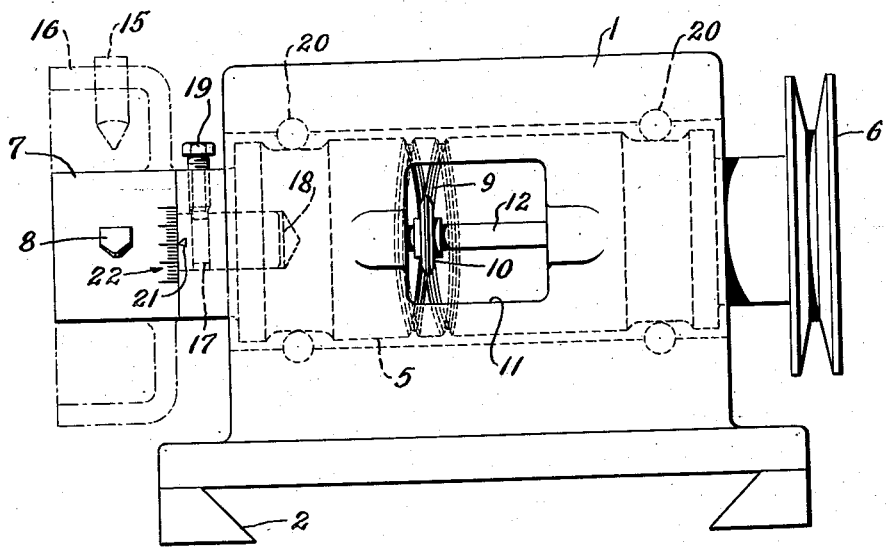
Figure 3:
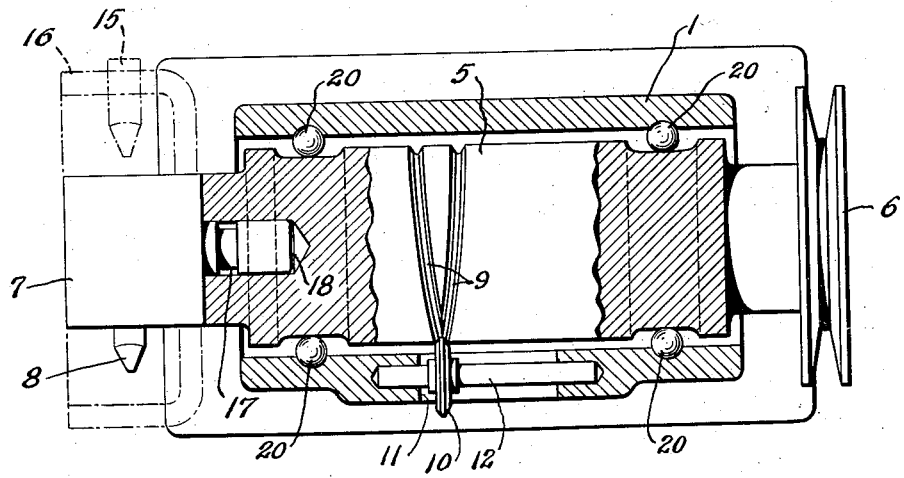
Figure 4:
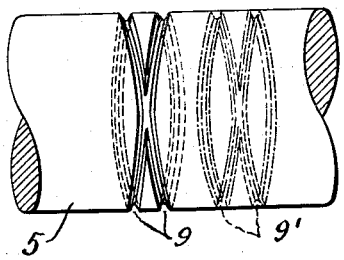
Figure 5:
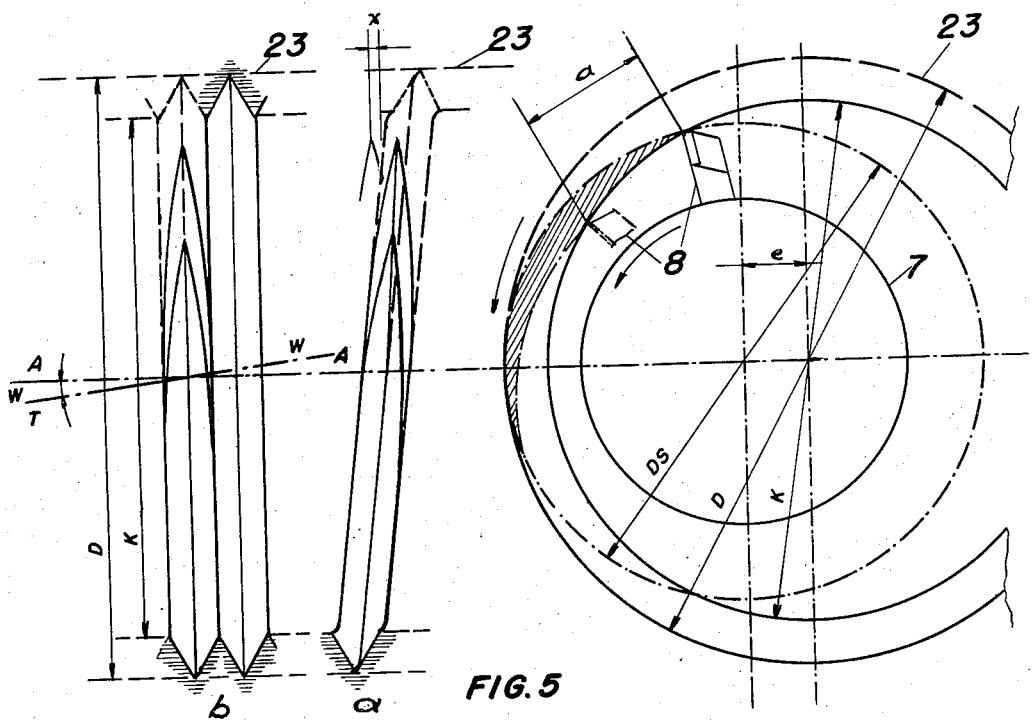

Fig. 1 is a side view of my novel device for cutting internal threads, shown mounted on a lathe, Fig. 2 is a side view of said device shown in an enlarged scale and also shown, in dotted lines, an alternate tool holder for cutting external threads, Fig. 3 is a top view, partially in longitudinal section of said device shown in an enlarged scale, and also shown in dotted lines an alternate tool holder for cutting external threads, Fig. 4 is a detail of the guide groove, Fig. 5 is a diagrammatic cross-section showing the path of the tool in relation to the workpiece for a non-oscillating tool cutting an internal thread, Fig. 5(a) shows the path of the tool when the rotational axis of the tool is parallel to the axis of the workpiece.

Fig. 5(b) shows the path of the tool with the rotational axis of the tool tilted into the helix angle of the thread being cut.

Figure 6:
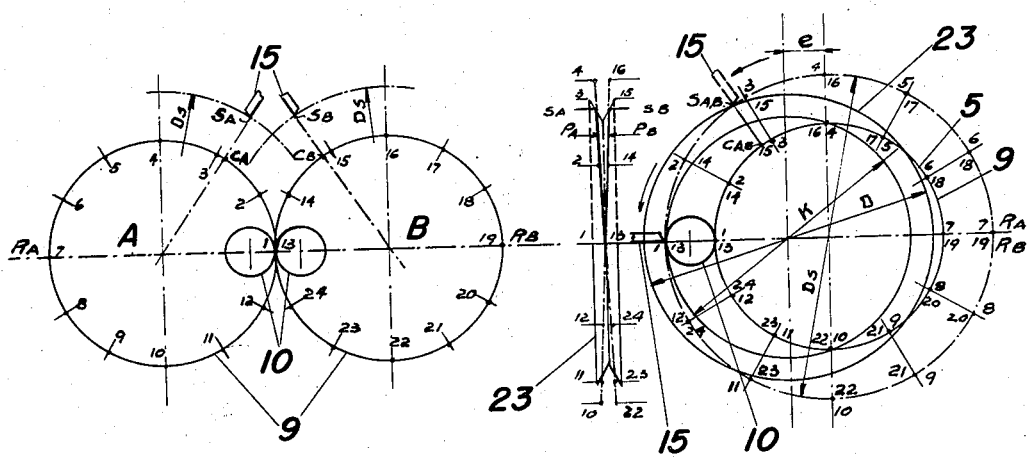
Figures 7, 8:
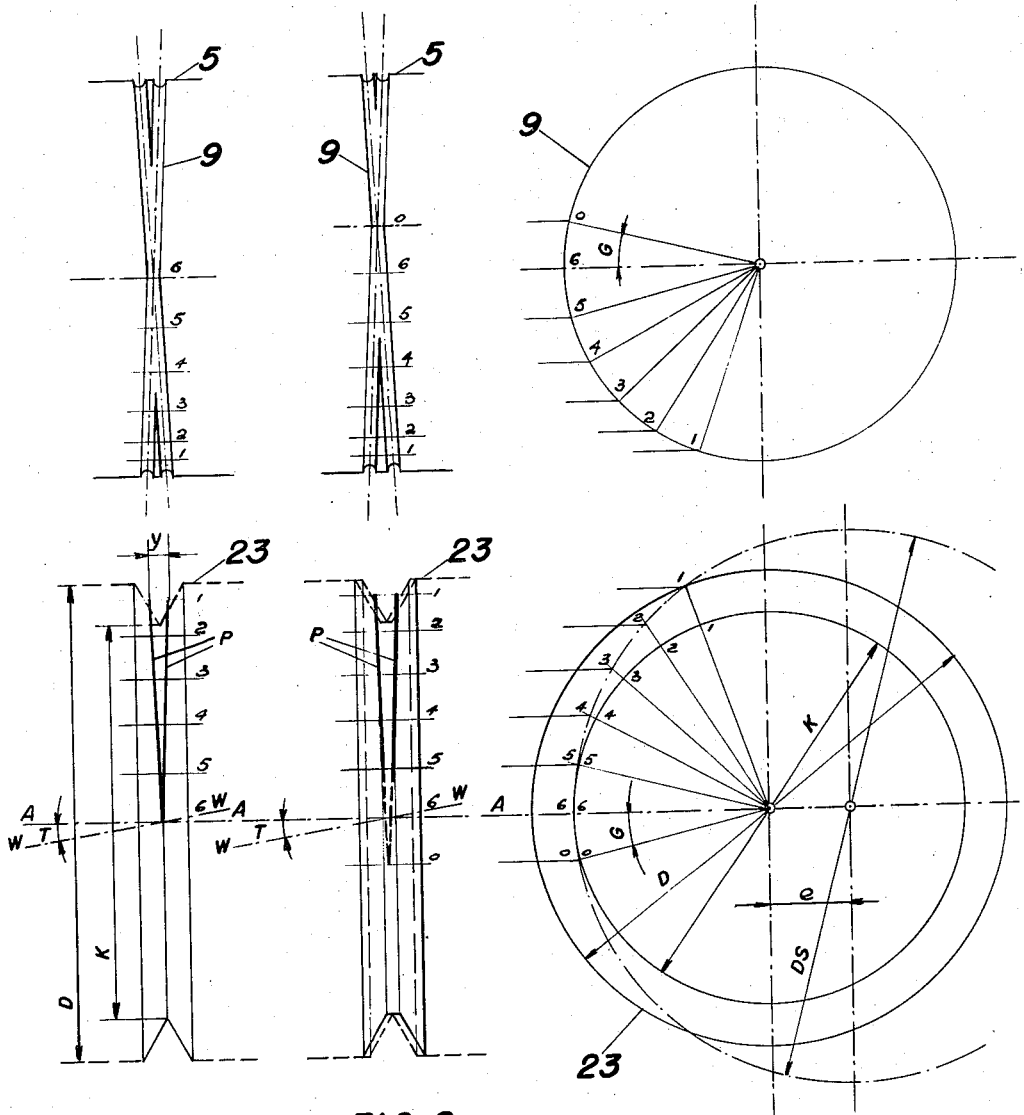

Fig. 6 is a diagram showing the momentary positions of the tool in relation to the control wheel and grooves, Fig. 7 shows diagrammatically the relation of the figure eight loop to the path of the tool point with the crossings of the tool and groove in the horizontal plane through the workpiece axis, Fig. 8 shows diagrammatically the relation of the figure eight loop to the path of the tool point with the crossing of the figure eight orbit of the tool moved angularly away from the figure eight loop crossing of the controlled groove.

Similar reference numerals denote similar parts in the different views.

Reading on the drawings, Figs. 1, 2, 3, and 4, shaft 5, is mounted in case 1, by means of ball bearings 20, on slide rest 2, on carriage 3, of lathe 4. Said shaft 5, carries on one extension, a driving pulley 6, and on its other extension, tool holder 7, 16, with cutting tool 8, 15, for cutting threads. An endless guide groove 9, looped-shaped in the form of a figure eight loop is cut into the periphery of shaft 5. Said guide groove 9, engages a guide wheel 10, projecting through opening 11, in the side wall of said case 1. Said guide wheel 10, is rotatably mounted on shaft 12, and the ends of said shaft 12 are supported in the wall of said case 1, said guide wheel 10 being also fixed relative to its axial movement on said stationary shaft 12. Said shaft 5, may be equipped with several guide grooves 9, and 9', or multiples thereof, as shown in Fig. 4, in order to distribute the stress and strain over several guide grooves 9, 9' where they exceed the limitations of one guide groove 9. Shaft 5, driven by motor 13, belt 14, and pulley 6, causes guide groove 9, 9', engaging guide wheel 10, to oscillate said shaft 5, together with tool 8, 15, in an axial direction of shaft 5.

Tool 8, held in tool holder 7, attached to said shaft 5, as shown in Figs. 2 and 3, is used for cutting internal threads.

Tool 15, held in bell-shaped tool holder 16, attached to said shaft 5, as shown in Figs. 2 and 3, is used for cutting external threads.

Reading on Figs. 5, 6, 7, and 8, the peripheral contour of said guide wheel 10, fits the profile of said guide grooves 9, 9'. The two lobes, designated as "A" and "B" in Fig. 6, of one complete figure eight loop 9, 9', are preferably placed close together giving to said guide grooves 9, 9', a very small lead or pitch about the cross-over point (see Fig. 7). The angle formed thus between a plane through said guide wheel 10, and a plane through the section of said guide grooves 9, 9', which is a momentary engagement with said guide wheel 10, becomes negligibly small, allowing said guide wheel 10, to remain in continuous engagement with said guide grooves 9, 9', and said guide wheel 10, being stationary relative to its plane of rotation, except for a slight rocking movement on its stationary shaft 12, causes said shaft 5, with said tool 8, 15, to oscillate axially equal to the axial displacement of said grooves 9, 9'. (As indicated by distance shown on Fig. 7.)

In the application of my invention said tool 8, 15, follows a three dimensional path relative to said workpiece 23, during each revolution. (See diagram Figs. 5 and 6.) Said tool 8, 15, having a rotative movement either around, or within, said workpiece 23, instigated by said driving motor 13, a radial movement due to the eccentricity "e" between said axis of said oscillating shaft 5, and said axis of said workpiece 23, and an axial movement congruent to the configuration of said guide grooves 9, 9'.

During the thread cutting operation said tool 8, 15, start to engage said workpiece 23 on its peripheral surface, at a point which may usually be located anywhere between 30° to 80° out of the horizontal position depending on the eccentricity "e" between said workpiece and said oscillating shaft 5, and also on the depth of the thread being cut. (Shown in Fig. 5 and also indicated as "S," "A," "B," in Fig. 6.) As said tool 8, 15, continue their rotation they remove a short chip from said workpiece 23, and complete the cut when said tool 8, 15, reaches the horizontal position. (See point 1, 13, in Fig. 6.) During this cutting stroke said tool 8, 15, move regularly from the surface of said workpiece 23 to the full depth of said thread being cut. (See shaded section in Fig. 5.) Said full depth of said cut occurs at said horizontal position. When said tool 8, 15, pass the horizontal position they reverse their radial movement and clear away from said workpiece 23 and no longer do any cutting, because the material beyond the horizontal position has been removed from said thread groove by previous cuts. Said tool 8, 15, continue on their return and cooling path ready for the next cut, while said slowly rotating workpiece 23 advances by a small angle "a" (see Fig. 5) in proportion to the thickness of the chip to be removed next, repeating the above described operation.

In the thread cutting method above set forth no axial movement of the thread cutting tool 8, 15, has been assumed and said tool 8, 15, would be cutting along two flanks. (Diagram Fig. 5.) The principal object of this invention is to have the tool 8, 15, cut along a single flank removing flat chips. To accomplish this said tool 8, 15, are given an axial movement in addition to the previously described movement, and is achieved by the use of guide groove 9, 9', and guide wheel 10.

The relative position of said tool 8, 15, to said guide groove 9, 9', is normally so selected, that when the cutting edge of said tool 8, 15, engaging said workpiece 23, in the horizontal position and in the full depth of the thread being cut, the axial movement of said oscillating shaft 5, is then at its mid-point, the point at which the cross-over point of said guide groove 9, 9', passes under said guide wheel 10. (See diagram Figs. 6 and 7.) After said tool 8, 15, moves out of the mid-position they also move away radially from said workpiece 23, as previously described, and simultaneously continue to move axially, without cutting, in one direction until the reversing point of one of the lobes "a," or "b," (see Fig. 6) of said figure eight guide groove 9, 9', reaches said guide wheel 10, which is 180° apart, or opposite said cross-over point on said oscillating shaft 5. (See points "RA" and "RB" in Fig. 6.) Beyond said reversing points "RA," or "RB," on said lobes 9, 9', said axial movement of said tool 8, 15, reverse to the opposite direction passing again through said mid-position, points 1, 13, in Fig. 6, after which said guide wheel 10, engages the other lobe "A," or "B," in Fig. 6, of said figure eight guide groove 9, 9', and after passing its reversing point "RA," or "RB," the axial movement assumes again the first designated direction, when said tool 8, 15, reaches said mid-position, the cycle is then repeated. The maximum axial displacement of said groove 9, 9', is the lineal distance between the reversing points "RA" and "RB," of each lobe of said figure eight guide grooves 9, 9'.

The lead or pitch of the thread being cut is governed through the lead screw of said lathe 4, by the conventional methods and is not primarily related to the helix angle of said guide grooves 9, 9' or the amplitude of said oscillation of said tools 8, 15.

Where the starting point of said tool 8, 15, on said workpiece 23, falls outside the thread groove being cut (shown as "x" on diagram Fig. 5), said oscillating shaft 5, is given a slight tilt in the vertical plane, (see diagram Fig. 5, where "A—A" is said oscillating shaft axis and "W—W" is said workpiece axis and "T" is the tilting angle).

To bring said tool 8, 15, angularly in line with said groove cross-over point on said oscillating shaft 5, an angular adjustment selective in either direction between said oscillating shaft 5, and said tool holder 7, 16 is provided for.

Tool holder 7, 16, carrying cutting tool, 8, 15, adjustably mounted in relation to shaft 5, by means of pin 17, in bore 18, of shaft 5, and fixably by set screw 19, thus, the position of tool 8, 15, can be very angularly in relation to guide grooves 9, 9'.

An angular movement (see "G" in diagram Fig. 8) of said tool holder 7, 16, in respect to said oscillating shaft 5, by a few degrees in either direction increases the amplitude of oscillation of said tool 8, 15, during said cutting path. A larger amplitude of said oscillation during said cutting path causes said tool 8, 15, to cut a wider thread groove. (See diagram Fig. 8.)

Index 21, and scale 22, between shaft 5, and the rotable tool holders 7, 16, shown in Fig. 2 simplifies the adjusting of the angle between said tools 8, 15, and said crossing point of said guide grooves 9 and 9'.

While the invention has been described in detail with respect to a preferred example and embodiment of the invention it will be understood by those skilled in the art after understanding the invention that various changes and modifications may be made without departing from the spirit and scope of the invention and it is intended, therefore, to cover all such changes and modifications in the appended claims.

I claim:

1. A device of the kind described for cutting threads on a workpiece, a shaft rotatably mounted in a case, said shaft arranged to oscillate in the direction of its axis, said shaft having a single continuous guide groove with a single crossing around its periphery, in loops, in the form of a figure eight and a stationary control element mounted in said case, said stationary control element consisting of a wheel, with a stationary shaft, said wheel engaging said guide groove, said rotatably mounted shaft having adjustably attached a bell-shaped tool holder, for moving a single point cutting tool in a cylindrical figure eight path.

2. A device according to claim 1, wherein said shaft has a multiple of continuous congruent guide grooves and guide wheels with single crossings around its periphery in loops in the form of figures eight.

3. A device of the kind described for cutting threads on a workpiece, a shaft rotatably mounted in a case, said shaft arranged to oscillate in the direction of its axis, said shaft having a single continuous guide groove with a single crossing around its periphery, in loops, in the form of a figure eight, and a stationary control element mounted in said case, said stationary control element consisting of a wheel, with a stationary shaft, said wheel engaging said guide groove, said rotatably mounted shaft having adjustably attached a tool holder for moving a single point cutting tool in a cylindrical figure eight path.

4. A device according to claim 4, wherein said shaft has a multiple of continuous congruent guide grooves and guide wheels with single crossings around its periphery in loops in the form of a figure eight.

References Cited in the file of this patent

UNITED STATES PATENTS

| | | |
|---|---|---|
| 1,507,235 | Hall | Sept. 2, 1924 |
| 2,159,207 | Godfriaux | May 23, 1939 |
| 2,189,867 | Hagerman | Feb. 13, 1940 |
| 2,236,909 | Johanson | Apr. 1, 1941 |
| 2,268,326 | Stewart et al. | Dec. 30, 1941 |
| 2,393,727 | Aber | Jan. 29, 1946 |

FOREIGN PATENTS

| | | |
|---|---|---|
| 645,533 | Great Britain | Nov. 1, 1950 |